United States Patent [19]

Hara et al.

[11] Patent Number: 4,856,908

[45] Date of Patent: Aug. 15, 1989

[54] MIXING HEAD OF INJECTION MOLDING MACHINE

[75] Inventors: Noboru Hara; Shogo Sugiyama, both of Aichi, Japan

[73] Assignee: Toyoda Gosei Co., Ltd., Nishikasugai, Japan

[21] Appl. No.: 162,206

[22] Filed: Feb. 29, 1988

[30] Foreign Application Priority Data

Mar. 6, 1987 [JP] Japan .................................. 62-52638
Mar. 11, 1987 [JP] Japan .................................. 62-57503

[51] Int. Cl.⁴ ............................................ B29C 45/03
[52] U.S. Cl. .................................. 366/182; 422/133; 425/206; 425/543

[58] Field of Search ............... 425/200, 206, 573, 542, 425/543, 557, 564, 565, 566, 573, 205; 366/76, 150, 182; 422/133, 108, 110

[56] References Cited

U.S. PATENT DOCUMENTS 4,749,554 6/1988 Proksa et al. ........................ 425/543

Primary Examiner—Willard Hoag
Attorney, Agent, or Firm—Cushman, Darby & Cushman

[57] ABSTRACT

A mixing head of an injection molding machine has an injection plunger for opening and closing a plurality of orifices and a spool plunger for opening and closing a plurality of circular passageways. The plunger and the spool are disposed parallel to each other.

11 Claims, 5 Drawing Sheets

MIXING HEAD OF INJECTION MOLDING MACHINE

BACKGROUND OF THE INVENTION

This invention relates to a mixing head of an injection molding machine in which two or more kinds of liquids are injected while mixing with each other under a high pressure.

The applicant has already proposed a type of an injection molding machine wherein two or more kinds of liquids are injected while mixing with each other under a high pressure.

In the earlier proposed injection molding machine, a mixing head has an injection plunger for opening and closing two orifices from which two kinds of liquids to be mixed are ejected under a pressure, and a spool plunger disposed perpendicular to the injection plunger for opening and closing two paths through which the two liquids are circulated. The injection plunger and spool plunger are moved synchronously and reciprocally by two oil cylinders, respectively.

However, in such an injection molding machine, as the reciprocal direction of the spool plunger is perpendicular to that of the injection plunger in the head portion of the mixing head, the head portion has an outer shape of many convex and concave portions and its weight is increased with a bulky shape. Therefore, the assembling of the mixing head in the injection molding machine is inconvenient.

Further, as the injection plunger and the spool plunger are located relatively far from each other, the oil passageways between both oil cylinders becomes long, so that the reciprocal movements of the injection plunger and the spool plunger are not easily carried out synchronously with each other.

Further, when the injection plunger and the spool plunger are moved, the directions of those movements are perpendicular to each other. Therefore, a twist force is exerted on the mixing head thereby to loosen the head portion on the machine. This decreases durability of the machine.

SUMMARY OF THE INVENTION

It is an object of the present invention to provide an injection molding machine whose whole shape is relatively small and in which oil paths communicated with oil cylinders for driving a injection plunger and a spool plunger are shortened and in which a twist force is not exerted thereon.

According to this invention there is provided a mixing head of an injection molding machine for injecting two or more kinds of liquids components under a high pressure while mixing with each other, which comprises: a injection plunger for opening and closing simultaneously two or more orifices from which each liquid is injected; and a spool plunger for opening and closing simultaneously two or more circular passageways through which each liquid is circulated, the injection plunger and the spool plunger being so disposed as to be moved reciprocally and parallel to each other. The nature, utility, and further features of this invention will be more clearly apparent from the following detailed description with respect to a preferred embodiment of the invention when read in conjunction with the accompanying drawings, briefly described below.

BRIEF DESCRIPTION OF THE DRAWINGS

In the accompanying drawings.

DETAILED DESCRIPTION OF THE PREFERRED EMBODIMENT

As conducive to a full understanding of the nature and utility of the present invention, a brief consideration of a typical mixing head of an injection molding machine will be first presented below with reference to FIGS. 7 and 8 principally for the purpose of comparison therebetween.

Figure 7:
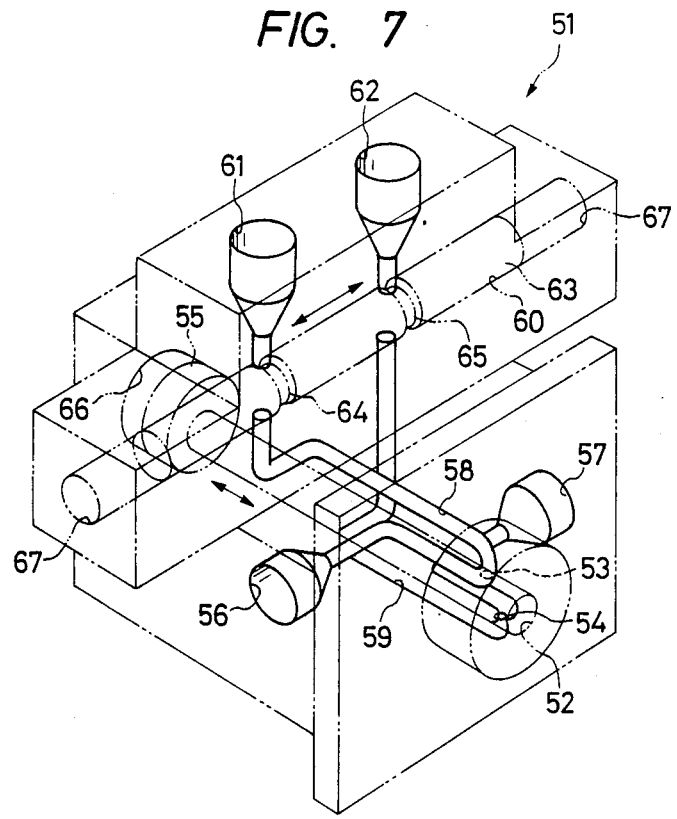
FIG. 7 is a perspective view of a formerly proposed mixing head, showing a general construction thereof; and, FIG. 8 is a partial sectional view of a construction near a mixing room of the formerly proposed mixing head.
Figure 8:
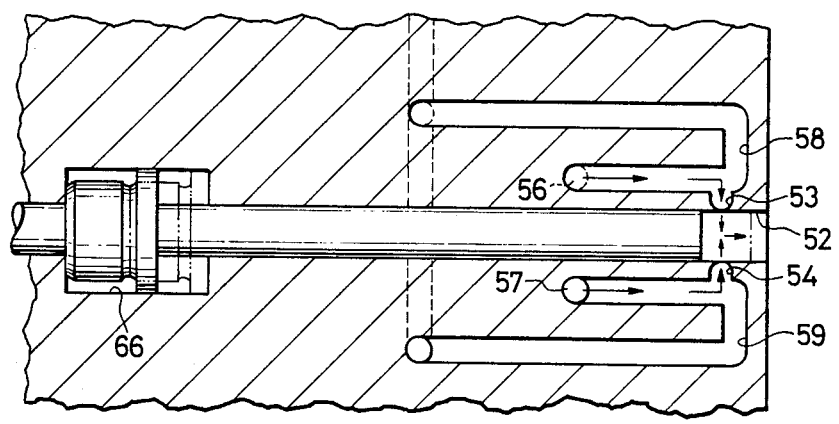

In FIGS. 7 and 8, the head portion 51 of a mixing head has a plunger hole 52 into which an injection plunger 55 ("plunger" hereinafter) moved by changing the direction of oil pressure in a first oil cylinder 66 is inserted. On the upper and lower sides of the plunger hole 52 are disposed two circular fluid passageways 58,59 extending from two fluid inlets 56, 57 formed on the side faces of the head portion 51, respectively. The two passageways 58,59 have two orifices 53,54 communicated with the plunger hole 52 at the front portion of the head 51, respectively. Further, the distal end portions of the passageways 58,59 are cut partially at a spool inserting hole 60 extending in the direction perpendicular to the plunger hole 52, and are communicated with two fluid outlets 61,62, respectively.

Into the spool hole 60 is inserted a spool plunger ("spool" hereinafter) 63 having two grooves 64,65 for opening and closing the circular passageways 58,59 at the same time, and the spool 63 is moved reciprocally by changing oil pressure in a second oil cylinder 67 at both side ends of the hole 60.

The first and second oil cylinders 66,67 have two oil passageways (not shown), respectively, and the plunger 55 and the spool 63 are reciprocally moved synchronously with each other when oil is supplied into the oil cylinders 66,67 at the same time.

In the above mentioned mixing head of the injection molding machine, when the plunger 55 is moved to a position indicated by an imaginary line to close the orifices 53,54 and to move the spool 63 to a position where the passageways 58,59 are open, each liquid is circulated through the liquid inlet 56, the passageway 58, the liquid outlet 61 and a liquid tank (not shown) or through the inlet 57, the passageway 59, the liquid outlet 62 and the liquid tank (not shown). When the plunger 55 is moved to a position indicated by a full line to open the orifices 53,54 and to close the paths 58,59, each liquid is injected under a high pressure in the axial direction of the hole 52 while colliding and mixing with each other therein.

However, as the reciprocal direction of the spool 63 is perpendicular to that of the plunger 55 in the head portion 51 of the mixing head, the head portion 51 has an outer shape of many convex and concave portions and its weight is increased with a bulky shape. Therefore, the assembling of the mixing head in the injection molding machine is inconvenient.

Further, as the plunger 55 and spool 63 are located relatively far from each other, the oil path between both oil cylinders 66,67 becomes long, so that the reciprocal movements of the plunger 55 and spool 63 are not easily carried out synchronously with each other.

Further, when the plunger 55 and spool 63 are moved, the directions of those movements are perpendicular to each other. Therefore, a twist force is exerted on the mixing head thereby to loosen the head portion on the machine. This decreases durability of the machine.

In view of these defects in the formerly proposed injection molding machine, the following invention will now be proposed.

The following explanation concerns an embodiment in which this invention is applied to a mixing head of an injection molding machine for reaction of urethane.

Figure 1:
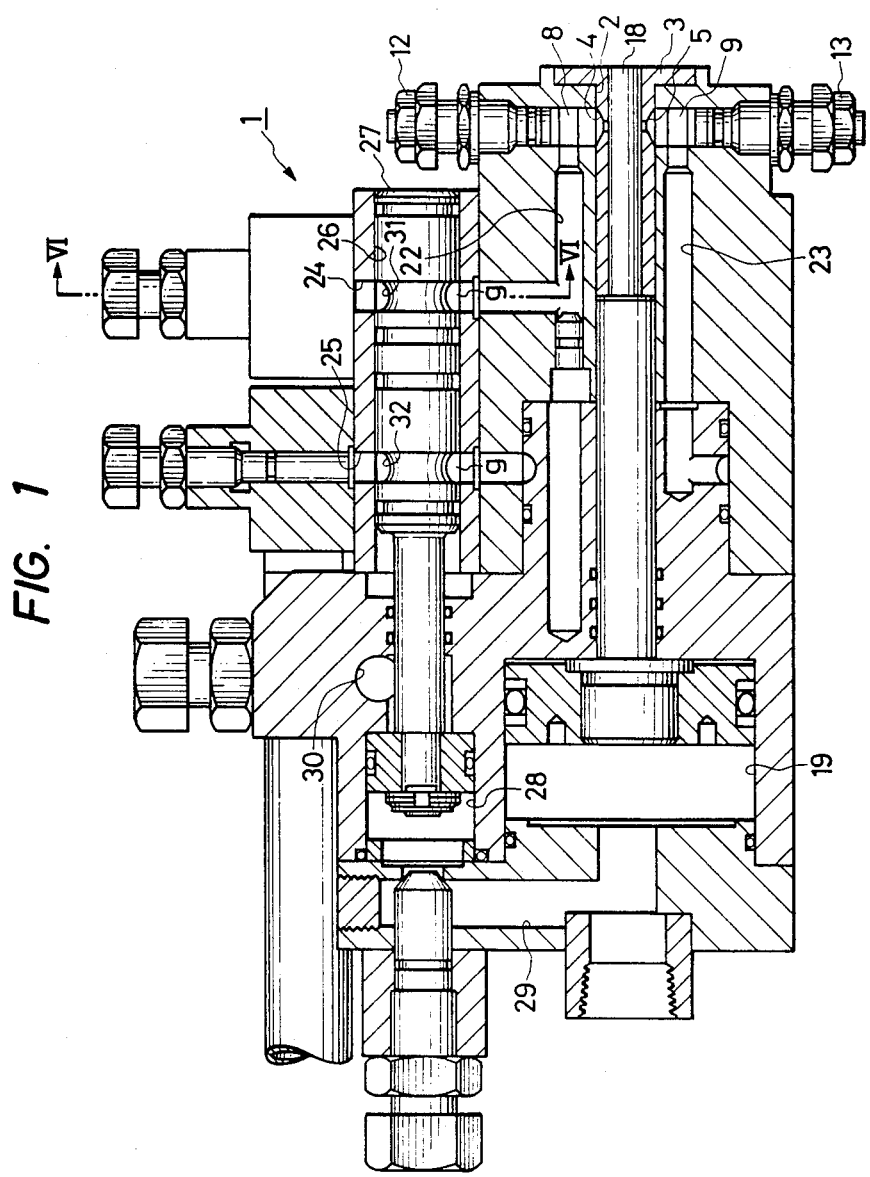
FIG. 1 is a longitudinally elevationally sectional view of a mixing head of an injection molding machine according to this invention.
Figure 2:
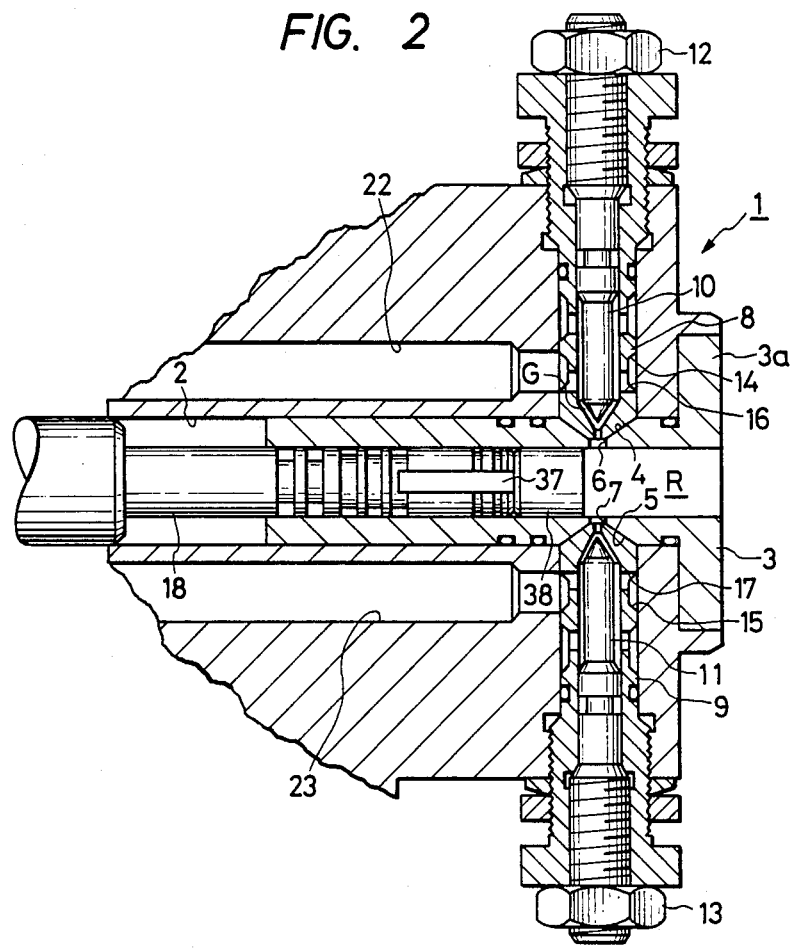
FIG. 2 is an enlarged sectional view showing structure of two orifices and mixing room.
Figure 3:
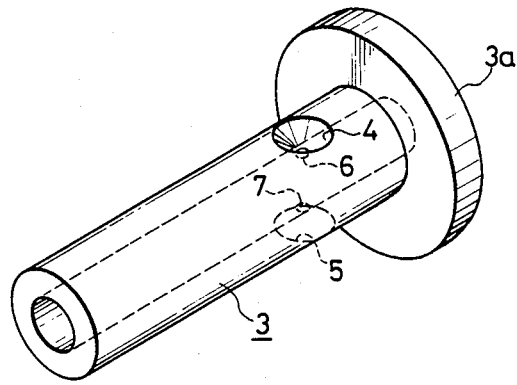
FIG. 3 is a perspective view of a sleeve.

As shown in FIG. 1, a mixing head body 1 of a mixing head in this embodiment has a plunger hole 2 for receiving an injection plunger ("plunger," hereinafter) 18 made of steel and the hole 2' located on an extension line of a spool of a metal mold. A sleeve 3 of a generally cylindrical shape is inserted in the hole Z at the inner wall of the front end (right side as viewed in FIG. 1) thereof. As shown in FIGS. 2 and 3, a pair of conical recesses 4,5 are disposed opposite to each other on the outer circumferencial portions and the recesses 4,5 have, at their respective distal ends, two ports 6,7 communicated with a mixing room R defined by the inner circumferencial surface of the sleeve 3.

The sleeve 3 is made of steel which has a wear resistance lower than that of the plunger 18 and has a flange 3a formed integrally with its main body at its front end as shown in FIG. 3. The sleeve 3 is detachably provided in the hole 2 by a plurality of bolts (not shown).

As shown in FIGS. 1 and 2, the distal ends of two orifices 8,9 disposed opposite to each other and extended from both side faces of the head portion 1 are engaged with the recesses 4,5 respectively.

The distal end portions of the orifices 8,9 have a diameter decreased gradually toward the sleeve 3, respectively and the front ends of the orifices 8,9 are communicated with the ports 6,7. In the orifices 8,9 are accomodated more flow control valves 10,11 whose diameters are slightly smaller than the inner diameters of the orifices 8,9 to form two spaces G, G therebetweeen and whose front portions are conically shape, respectively. Therefore, when each liquid passes through the space G, the liquid is ejected under a high pressure from the front end of each orifice. When two nuts 12,13 provided on the rear ends of the valves 10,11 are rotated, the valves 10,11 are moved to change the spaces G whereby flow control of the liquids can be carried out.

Further, the orifices 8,9 have two grooves 14,15 at their respective outer circumferencial portions and the grooves 14,15 are communicated with the spaces G through the two ports 16,17, respectively.

The plunger hole 2 provided with the sleeve 3 has, therein, the plunger 18 reciprocally movable in the axial direction of the hole 2. The plunger 18 has a plug 38 at its distal end and a seal 37 extending longitudinally for separating liquid A from liquid B as mentioned after. The reciprocal movement of the plunger 18 is controlled by a first oil cylinder 19 provided at the rear portion of the plunger 18. The plunger 18 closes simultaneously the two ports 6,7 of the sleeve 3 at its front dead point (FIG. 1) and opens simultaneously the two ports 6,7 at its rear dead point (FIG. 2).

Figure 5:
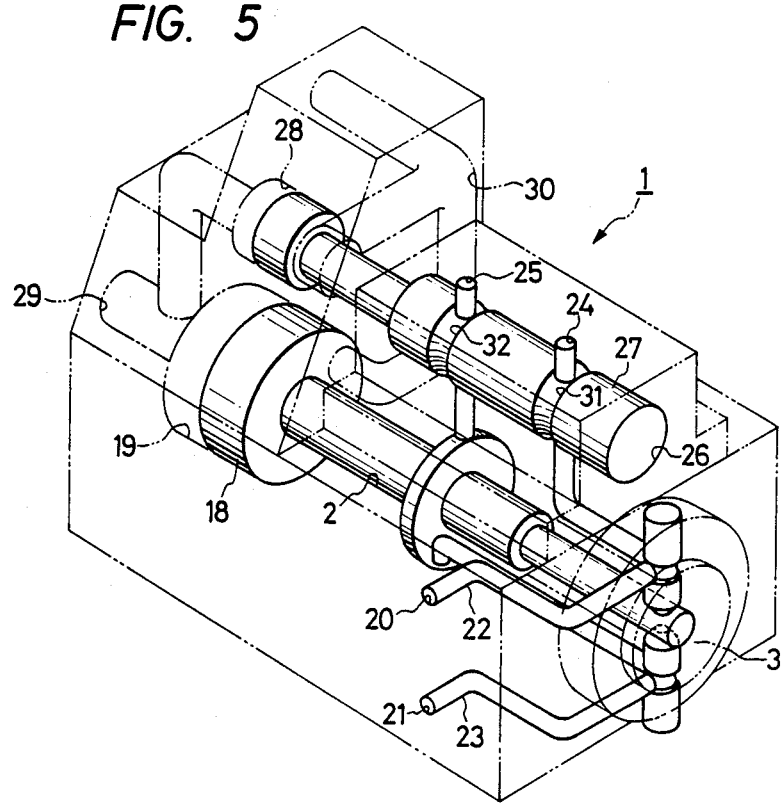
FIG. 5 is a perspective view of the mixing head, showing a general construction thereof according to this invention.
Figure 6:
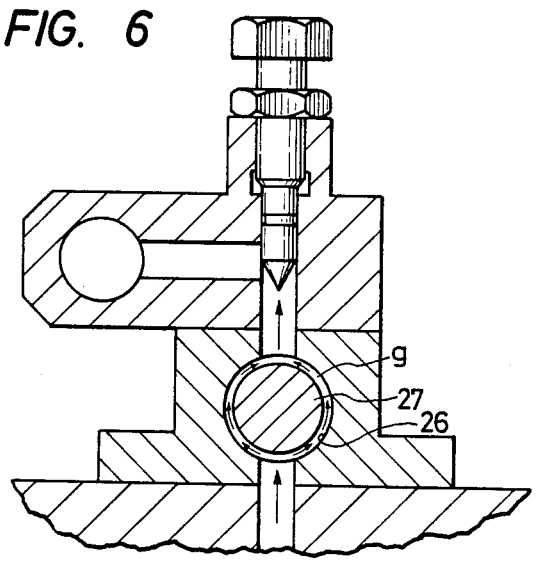
FIG. 6 is a sectional view of the mixing head, taken along the line VI—VI.

As shown in FIG. 5, on the upper side of the plunger hole 2 is formed a circular passageway 22 extended from a liquid inlet 20 for liquid A (polyol) which is open to one side face of the mixing head body 1. The passageway 22 is bent to be connected with a groove 14 of the orifice 8 and extends parallel to the plunger 18 from the groove 14, and further, its front end is bent to open upwardly at a spool plunger 27 ("spool", hereinafter).

On the lower side of the plunger hole 2 is formed a circular path 23 extended from a liquid inlet 21 for liquid B polyisocyanate which is disposed in the mixing head body 1 under the liquid inlet 20 for liquid A. The passageway 23 is bent to be connected with a groove 15 of the orifice 8 and extends parallel to the plunger 18 from the groove 15 and extends around the plunger 18 and, further, the distal end of the passageway 23 is bent to open upwardly. The distal end portions of the passageway 22,23 are cut partially at a spool hole 26 which is disposed above and parallel to the plunger hole 2 to be connected to two liquid outlets 24,25 for liquids A and B.

The spool hole 26 accomodates the spool 27 movable reciprocally and its reciprocal movement is controlled by a second oil cylinder 28 disposed at the rear portion of the spool 27. The plunger 18 and the spool 27 are moved reciprocally and synchronously with each other by two oil passageways 29,30 communicated with the first and second oil cylinders 19,28 for supplying oil at the same time.

As shown in FIG. 1, the spool 27 has two annular grooves 31,32 of U-shape in section at two positions corresponding to the passageways 22,23. When the grooves 31,32 are opposed to the two passageways 22,23, respectively, liquids A and B are passed through two annular spaces g,g between the grooves 31,32 and the circumferential wall of the spool hole 26 (FIG. 5).

Figure 4:
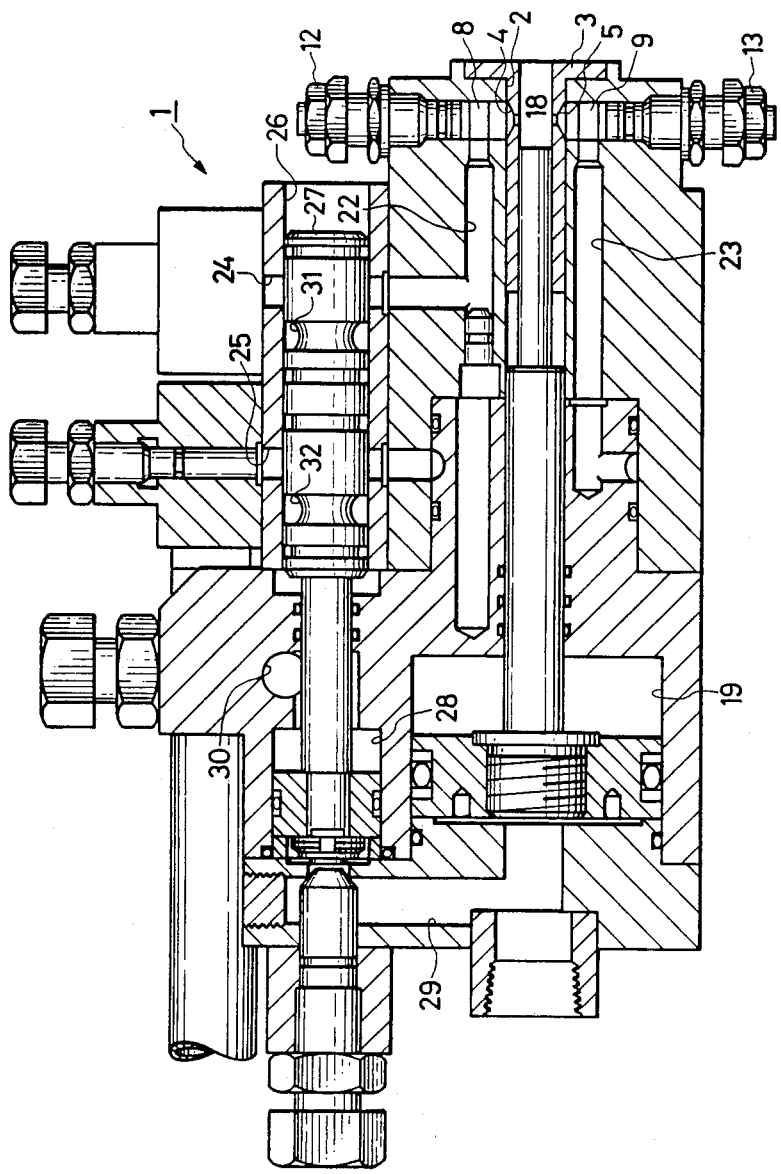
FIG. 4 is a longitudinally elevationally sectional view of the mixing head, showing a state wherein a spool is located at a rear dead point.

When the spool 27 is moved to the left as viewed in FIG. 4, the grooves 31,32 are deviated from the passageways 22,23 at the same time to close the annular spaces g at the same time. Therefore, the passageways 22,23 for liquids A and B can be opened and closed synchronously and simultaneously with each other.

The operation of this mixing head will now be explained.

First, the plunger 18 is moved at the front dead point (FIG. 1) so that orifices 8 and 9 are closed and simultaneously the grooves 31,32 of the spool 27 are opposed to the passageways 22,23. A pump (not shown) is then driven to circulate liquids A and B for a predetermined time between the pump and a liquid tank (not shown) through the liquid inlet 20, the passageway 22, the annular space g and the liquid outlet 24 and through the liquid inlet 21, the passageway 23, the annular space g and the liquid outlet 25.

In the following step, the plunger 18 is moved to the rear dead point (FIG. 4) whereby orifices 8 and 9 are opened and the spool 27 is moved to the left to move the grooves 31,32 from the passageways 22,23 thereby to close the passageways 22,23 at the same time. Thus, liquids A and B under a high pressure by the pump are injected from the orifices 8,9 into the mixing room R to mix while colliding with each other and the mixed liquid further runs in to the forward and axial direction of the plunger 18 (to the right in FIG. 4).

In this invention, as the plunger hole 2, the first oil cylinder 19, the oil passageway for the cylinder 19, the inserting hole 26, the second oil cylinder 28 and the oil passageway for the oil cylinder 28 are disposed in the same direction so that the reciprocal movements of the plunger 18 and the spool 27 become parallel to each other, the concave and convex portions of the mixing head are decreased in comparison with a prior mixing head (FIGS. 7 and 8) in which a plunger 55 and spool 63 are perpendicular to each other. Therefore, the mixing head becomes compact and light in weight whereby the assembling of the mixing head can be carried out easily.

Moreover, as the first oil cylinder 19 is disposed near the second oil cylinder, the oil passageways 29,30 which are communicated with both oil cylinders 19, 28, respectively, for supplying oil thereinto at the same time, are shortened in comparison to the prior arrangement as shown in FIGS. 7 and 8, whereby the synchronous and simultaneous movement of the plunger 18 and spool 27 can be facilitated.

In addition, as the plunger 18 and the spool 27 are moved reciprocally in the same direction, the directions of the movements of both members 18,27 become the same. Accordingly, a twist force is not exerted on the mixing head which avoids the loosening of the fastening portions of the mixing head and to increase its durability in comparison with a case that the directions of the movements of the two members are different from each other as shown in FIG. 7.

Further, as the sleeve 3 is made of steel whose wear resistivity is lower than that of the plunger 18, the plunger 18 is not damaged even if the plunger 18 is moved reciprocally for a long time. If the inner wall of the sleeve 3 is worn away, the worn sleeve 3 can be easily exchanged with a new one. In contrast, in the formerly proposed mixing head, it was necessary to disassemble the head and to assemble large parts when the mixing room was worn. However, in this invention, in such a case, only the sleeve 3 is pulled out of the plunger hole 2 and a new sleeve is put thereinto. Therefore, the non-operational time for maintenance of the machine becomes less to enable the machine to be used continuously.

Further, in the formerly proposed mixing head of FIGS. 7 and 8 the head portion 1 must be provided therein with two holes for the orifices 53,54. The two holes must be cut from the two sides of the head portion 51 and, accordingly, it is difficult to form the distal ends of the orifices 53,54 so as to be aligned with each other. However, in this invention, the recesses 4,5 forming the distal ends of the orifices 8,9 are formed on the sleeve 3 and, therefore, two through holes for the orifices 8,9 can be easily formed in the head portion 1 while aligning the two distal ends of the orifices 8,9 with each other by passing a drill through the head portion 1.

This invention is not limited to the above embodiment and, for example, the following modifications can be made.

(1) The grooves 31,32 formed on the spool 27 may have triangular or rectangular shape section in instead of a U-shape in section.

(2) This invention can be applied to a mixing head of an injection molding machine in which three or more kinds of liquids are injected under a high pressure. In this case, liquid inlets, circular paths, orifices and liquid outlets must be formed corresponding to the number of the liquids. Especially, it is desirable that the orifices are formed so that their axes intersect the approximate diametrical center of the mixing room.

(3) The flange 3a of the sleeve 3 may have a circular, rectangular, elliptical and the like shape.

What is claimed is:

1. A mixing head for an injection molding machine for injecting two or more kinds of liquids under a high pressure while mixing with each other in a mixing chamber, which comprises:
   a first plunger for opening and closing simultaneously two or more orifices from which said liquids are injected into said mixing chamber; and;
   a spool plunger for opening and closing simultaneously two or more paths through which said liquids are respectively circulated, the first plunger and the spool plunger being so disposed as to be moved reciprocally and parallel to each other;
   wherein the plunger is accommodated in a bore into which a sleeve is removably disposed for receiving at least a part of the plunger, the sleeve having a wall containing two or more recesses for forming parts of said two or more orifices.

2. A mixing head according to claim 1, wherein the sleeve is made of material whose wear resistance is lower than that of the first plunger.

3. A mixing head for an injection molding machine for mixing at least two liquid components comprising:
   a mixing head body having a mixing chamber and at least two passageways for said components which include inlets, outlets, and orifices therebetween for injecting said components into said mixing chamber,
   an injection plunger for opening and closing said orifices,
   a single spool plunger disposed in parallel with said first plunger for opening and closing simultaneously said passageways through which each component flows, and
   means for reciprocally operating said injection plunger and said spool plunger to different positions to simultaneously open said orifices and close said passageways in one position and simultaneously close said orifices and open said passageways in another position.

4. The mixing head according to claim 3, further comprising a sleeve having recesses as parts of said orifices which sleeve is detachably inserted in said mixing chamber to receive at least a part of said injection plunger.

5. The mixing head according to claim 4, wherein said sleeve is made of material having a wear resistance lower than that of said injection plunger.

6. A mixing head for an injection molding machine for mixing at least two liquid components comprising:
   a mixing head body having a mixing chamber and a plurality of passageways for respectively passing therethrough said components towards spaced outlets portions thereof, each of said passageways having an orifice for injecting each of said components into said mixing chamber, a plurality of outlets to lead said components out of said mixing head body through said passageways, a single spool plunger having a plurality of grooves provided at the same spacing as that of said outlet portions of said passageways, said spool plunger being movable so that each of said grooves connects and disconnects said outlet portions and corresponding said outlets with and from each other, an injection plunger disposed in parallel with said spool plunger for opening said orifices simultaneously with one another so that said components are injected into said mixing chamber and closing said orifices simultaneously with one another, and means for operating said injection plunger and said spool plunger to cause said injection plunger to close said orifices at the same time as said spool plunger simultaneously connects said outlet portions and said corresponding outlets with each other and to cause said injection plunger to open said orifices at the same time as said spool plunger simultaneously disconnects said outlet portions from said corresponding outlets so that said components will be injected from said orifices into said mixing chamber.

7. The mixing head according to claim 6, further comprising a sleeve having recesses as parts of said orifices which sleeve is detachably inserted in said mixing chamber to receive at least a part of said injection plunger.

8. The mixing head according to claim 7, wherein said sleeve is made of material having a wear resistance lower than that of said injection plunger.

9. A mixing head for mixing at least two components comprising:
a mixing head body having a mixing chamber and at least two passageways for said components which passageways include inlets, outlets, and orifices therebetween for injecting said components into a said mixing chamber, a reciprocal injection plunger for closing and opening said orifices, a reciprocal single spool plunger disposed in parallel with said injection plunger and having at least two grooves and intersecting said passageways between said orifices and said outlets to open or to close said passageways simultaneously by locating or not locating each of said grooves on each of said passageways, and means for reciprocally operating said injection plunger and said spool plunger to cause said injection plunger to close said orifices and open said passageways so said components flow from said inlets through said outlets and to cause said injection plunger to close said passageways and open said orifices for injecting said components into said mixing chamber.

10. The mixing head according to claim 9, further comprising a sleeve having recesses as parts of said orifices which sleeve is removably disposed in said mixing chamber to receive a part of said injection plunger.

11. The mixing head according to claim 10, wherein said sleeve is made of material having a wear resistance lower than that of said injection plunger.

* * * * *